United States Patent
Hargraves et al.

(10) Patent No.: US 7,762,796 B2
(45) Date of Patent: Jul. 27, 2010

(54) PUMP VALVE WITH CONTROLLED STROKE

(75) Inventors: Donald Edwin Hargraves, Huntersville, NC (US); Douglas Allan Curtis, Troutman, NC (US)

(73) Assignee: Hargraves Technology Corporation, Mooresville, NC (US)

( * ) Notice: Subject to any disclaimer, the term of this patent is extended or adjusted under 35 U.S.C. 154(b) by 114 days.

(21) Appl. No.: 10/565,256

(22) PCT Filed: Jul. 23, 2004

(86) PCT No.: PCT/US2004/023833

§ 371 (c)(1),
(2), (4) Date: Jan. 19, 2006

(87) PCT Pub. No.: WO2005/010363

PCT Pub. Date: Feb. 3, 2005

(65) Prior Publication Data

US 2006/0177330 A1    Aug. 10, 2006

Related U.S. Application Data

(60) Provisional application No. 60/489,425, filed on Jul. 23, 2003.

(51) Int. Cl.
F04B 39/10    (2006.01)
F04B 53/10    (2006.01)
F16K 15/14    (2006.01)
F16K 15/16    (2006.01)

(52) U.S. Cl. ................ 417/566; 417/569; 417/571; 137/851; 137/856

(58) Field of Classification Search ........... 417/550, 417/545, 559, 566, 569, 571, 572; 137/851, 137/856, 859, 857
See application file for complete search history.

(56) References Cited

U.S. PATENT DOCUMENTS

| 4,712,583 | A | * | 12/1987 | Pelmulder et al. | 137/852 |
| 4,723,896 | A |   | 2/1988  | Fritchman |  |
| 5,217,797 | A | * | 6/1993  | Knox et al. | 428/167 |
| 5,266,016 | A | * | 11/1993 | Kandpal | 417/569 |
| 5,346,373 | A | * | 9/1994  | Riffe | 417/415 |
| 5,601,118 | A | * | 2/1997  | Jang | 137/856 |
| 5,617,897 | A | * | 4/1997  | Myers | 137/859 |
| 5,785,508 | A | * | 7/1998  | Bolt | 417/560 |
| 5,934,305 | A |   | 8/1999  | Cho |  |
| 6,089,272 | A | * | 7/2000  | Brand et al. | 137/859 |
| 6,305,907 | B1 |  | 10/2001 | Becker et al. |  |
| 6,314,990 | B1 |  | 11/2001 | Brabek et al. |  |
| 2003/0194337 | A1 | * | 10/2003 | Na et al. | 417/569 |

* cited by examiner

*Primary Examiner*—Charles G Freay
(74) *Attorney, Agent, or Firm*—Adams Intellectual Property Law

(57) ABSTRACT

A valve assembly for a pump includes a pump chamber and a pump head having complementary recesses formed therein which cooperate to define a valve compartment including a pocket and an opposed seat. A flexible valve element is disposed between the recesses and adapted to move between a closed position against the seat which prevents fluid flow and an open position away from the valve seat which permits fluid flow. The dimensions of the valve compartment are selected to limit the movement of the valve element in the open position, which increases the pump efficiency and prevents damage to the valve element and/or valve overlap.

12 Claims, 4 Drawing Sheets

PUMP VALVE WITH CONTROLLED STROKE

BACKGROUND OF THE INVENTION

This invention relates generally to pumps and more particularly to a check valve for a pump. Many types of pumps use check valves; however for the purpose of describing the present invention diaphragm pumps in particular are considered herein. Typical diaphragm pumps use an elastomeric component as a passive check valve to facilitate the pumping action of the pump. A pump will typically contain two valves, one identified as the inlet valve and the other identified as the outlet valve. During the down-stroke or intake stroke of the pump, the suction action of the diaphragm will pull the inlet valve into an open position and the outlet valve into a closed position thus pulling the media into the pump on the inlet side only. During the up-stroke or exhaust stroke of the pump, the compression action of the diaphragm will push the inlet valve into a closed position and the outlet valve into an open position thus expelling the media on the outlet side only.

The valves will perform this action once during each cycle of the pump. For a diaphragm pump, this equates to once per full revolution. Therefore, a diaphragm pump that runs at 4000 RPM will cycle the valves 67 times per second. The speed of the pump, multiplied by the volume the pump displaces with each stroke determines how much force is applied to actuate the valve, thus directly impacting how far the valve will displace if not physically limited. If this valve travel distance is not controlled correctly, the valve can easily travel further than required or could also be over-restricted and not allowed to travel as far as needed. Either condition results in a pump that runs inefficiently and/or produces higher than desired noise levels.

Accordingly, there is a need for a pump valve having a controlled stroke.

BRIEF SUMMARY OF THE INVENTION

Therefore, it is an object of the invention to provide a valve assembly in which the stroke of a flexible valve is limited to prevent inefficiency and excess noise.

It is another object of the invention to provide a valve assembly which prevents overlap of intake and exhaust valves.

It is another object of the invention to provide a valve assembly having good sealing characteristics without excess travel of the valve elements.

These and other objectives are met by the present invention, which in one preferred embodiment includes a valve assembly for a pump, including a pump chamber having a first recess formed therein; a pump head having a second recess formed therein, the second recess cooperating with the first recess to define a first valve compartment including a first valve pocket and an opposed first valve seat; and a flexible first valve element disposed between the first and second recesses and adapted to move between a closed position against the first valve seat which prevents fluid flow and an open position away from the first valve seat which permits fluid flow in a first direction. The dimensions of the first valve compartment are selected to limit the movement of the first valve element in the open position.

According to another preferred embodiment of the invention, a valve assembly further includes a third recess formed in the pump chamber; a fourth recess formed in the pump head, the fourth recess cooperating with the third recess to define a second valve compartment including a second valve pocket and an opposed second valve seat; and a flexible second valve element disposed between the third and fourth recesses and adapted to move between a closed position against the second valve seat which prevents fluid flow and an open position away from the second valve seat which permits fluid flow in a second direction. The dimensions of the second valve compartment are selected to limit the movement of the second valve element in the open position.

According to another preferred embodiment of the invention, one of the valve elements is an intake valve for permitting flow from an intake port to a pump, and the other of the valve elements is an outlet valve for permitting flow from the pump to an outlet port. The dimensions of the first and second valve compartments are selected to limit the movement of the first and second valve elements when the pump is moving a fluid flow from the inlet port through the pump to the outlet port, such that at least one of the valve elements is always in the closed position.

According to another preferred embodiment of the invention, wherein the first and second valve elements include an elastomeric material.

According to another preferred embodiment of the invention, the first and second valve elements include ethylene propylene diene terpolymer.

According to another preferred embodiment of the invention, the first and second valve elements comprise a fluoroelastomer.

According to another preferred embodiment of the invention, the first and second valve elements comprise a perfluoroelastomer.

According to another preferred embodiment of the invention, the first and second valve elements comprise silicone.

According to another preferred embodiment of the invention, the first and second valve elements have a hardness from about 40 Durometer to about 90 Durometer.

According to another preferred embodiment of the invention, a pump assembly includes a pump chamber having a first recess formed therein; a pump head having housing having a second recess formed therein, the second recess cooperating with the first recess to define a first valve compartment including a first valve pocket and an opposed first valve seat; and a flexible first valve element having a selected first thickness disposed between the first and second recesses and adapted to move through a stroke length between a closed position against the first valve seat which prevents fluid flow and an open position away from the first valve seat which permits fluid flow. The dimensions of the first valve compartment are selected to limit the stroke length of the first valve element to less than about 1.6 times the first thickness.

According to another preferred embodiment of the invention, the valve assembly further includes a third recess formed in the pump chamber; a fourth recess formed in the pump head, the fourth recess cooperating with the third recess to define a second valve compartment including a second valve pocket and an opposed second valve seat; and a flexible second valve element having a selected second thickness disposed between the third and fourth recesses, and adapted to move between a closed position against the second valve seat which prevents fluid flow and an open position away from the second valve seat which permits fluid flow in a second direction. The dimensions of the second valve compartment are selected to limit the stroke length of the second valve element to less than about 1.6 times the second thickness.

According to another preferred embodiment of the invention, the dimensions of the first and second valve compartments are selected such that the stroke lengths of the first and second valve elements are from about 0.19 times the thickness of the respective valve element to about 0.93 times the thickness of the respective valve element.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
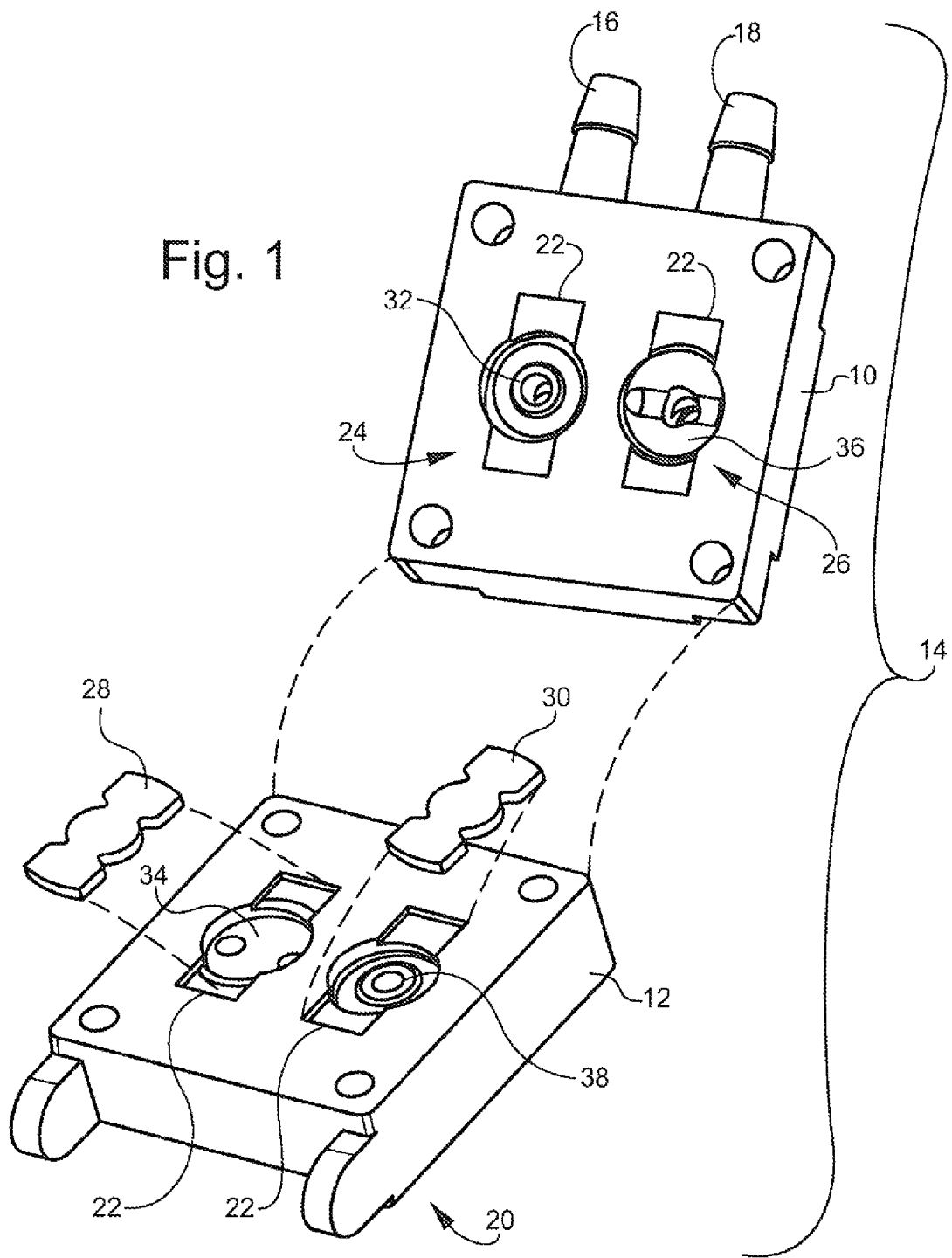
FIG. 1 is an exploded perspective view of a pump head constructed in accordance with the present invention.

FIG. 1 illustrates a portion of a prior art diaphragm pump assembly. A head 10 is attached to a chamber 12. The head 10 and the chamber 12 are referred to collectively as a pump head 14. Inlet and outlet connections 16 and 18 extend from the head 10. Each of these connections communicates with a fluid flow path through the pump head 14 and into a diaphragm pump body of a known type (not shown) which is attached to a lower end 20 of the pump head 14. The head 10 and the chamber 12 each have complementary recesses 22 therein. When the head 10 is assembled to the chamber 12, these recesses 22 cooperate to define an inlet valve compartment 24 and an outlet valve compartment 26. Inlet and outlet diaphragm valves 28 and 30 are received in these compartments and are trapped between the head 10 and the chamber 12. The upper part of the inlet valve compartment 24 is defined by an annular, radiused inlet valve seat 32 formed in the head 10. The inlet valve 28 seals against the inlet valve seat 32 in the closed position. The lower part of the inlet valve compartment 24 is defined by an inlet valve pocket 34 in the chamber 12 opposite the inlet valve seat 32.

The outlet valve compartment 26 is substantially identical to the inlet valve compartment 24, except for the direction of flow. The upper part of the outlet valve compartment 26 is defined by an outlet valve pocket 36 formed in the head 10. The lower part of the outlet valve compartment 26 is defined by annular, radiused outlet valve seat 38 in the chamber 12, opposite the outlet valve pocket 36. The outlet valve 30 seals against the outlet valve seat 38 in the closed position.

Figure 2:
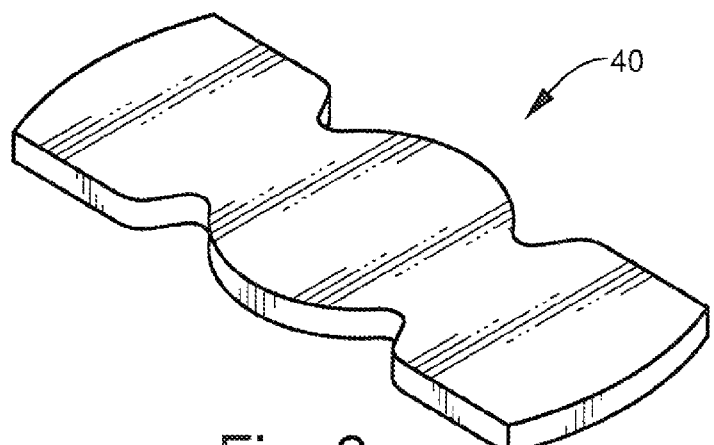
FIG. 2 is a perspective view of a valve for use with the present invention.
Figure 3:
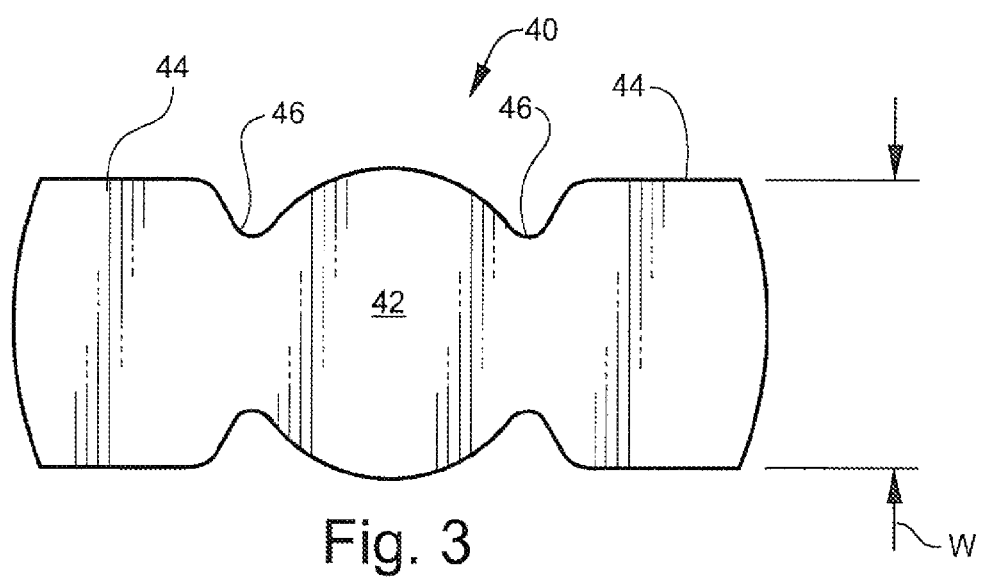
FIG. 3 is a top view of the valve of FIG. 2.
Figure 4:
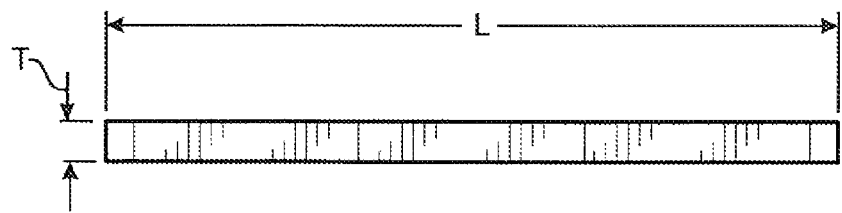
FIG. 4 is a side view of the valve of FIG. 2.

FIGS. 2, 3, and 4 illustrate an exemplary valve 40, which is representative of both the inlet valve 28 and the outlet valve 30 as used in the diaphragm pump described herein. The valve 40 is a flat, elongated member of an elastomeric material having a central portion 42 connected to a pair of end tabs 44 by a pair of necked-down portions 46. In the illustrated example the valve 40 has an overall length "L" of about 13.5 mm (0.530 in.), a width "W" of about 5.2 mm (0.205 in.), and a thickness "T" of about 0.69 mm (0.027 in.) These dimensions may be varied to suit a particular application.

Figure 5:
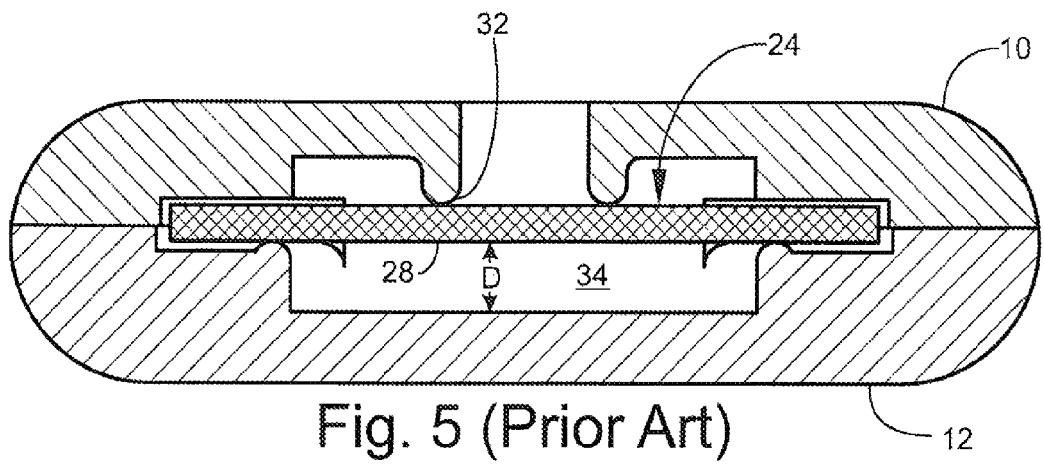
FIG. 5 is a side cross-sectional view of a prior art valve in an at-rest or closed position.
Figure 6:
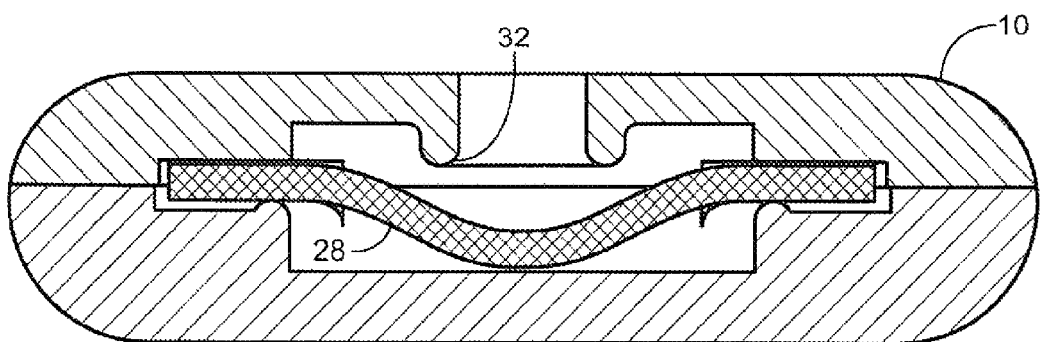
FIG. 6 is a side cross-sectional view of a prior art valve in a fully extended or open condition.

Each of the inlet and outlet valves 28 and 30 has a "stroke" defined as the deflection of its center portion from the fully open position to the fully closed position. FIGS. 5 and 6 show partial cross-sections through the inlet valve compartment 24 of the pump head 14 of FIG. 1. For a typical application the depth "D" of the prior art inlet valve pocket 34 is such that the inlet valve stroke may be about 1.14 mm (0.050 in.) Similarly, the outlet valve (not shown in FIGS. 5 and 6) has a stroke of about 1.27 mm (0.050 in.) The depth D of the prior art valve pockets allow an essentially uncontrolled stroke, with resulting over-travel, of the valves.

When the outlet valve 30 has over-traveled during the up-stroke, on the subsequent down-stroke, media will be pulled in through the inlet side and, for an unknown duration, the outlet side. This reduces the overall throughput (free flow) of the pump and the ability to achieve the maximum load points (pressure or vacuum). During the next up-stroke of the pump, the same effect will occur with the inlet valve 28. Because the inlet valve 28 was allowed to over-travel during the previous down-stroke, media will be will be expelled on the inlet side for an unknown duration in addition to the outlet side. Both of these conditions may be described as valve "overlap" which is undesirable in this type of pump.

Figure 7:
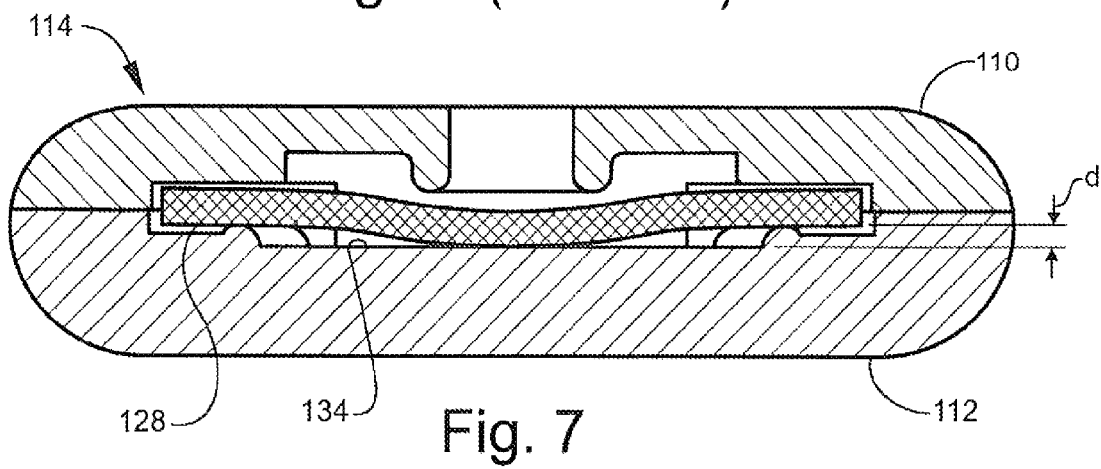
FIG. 7 is a side cross-sectional view of a valve compartment constructed in accordance with the present invention, with the valve in a fully extended or open position.
Figure 8:
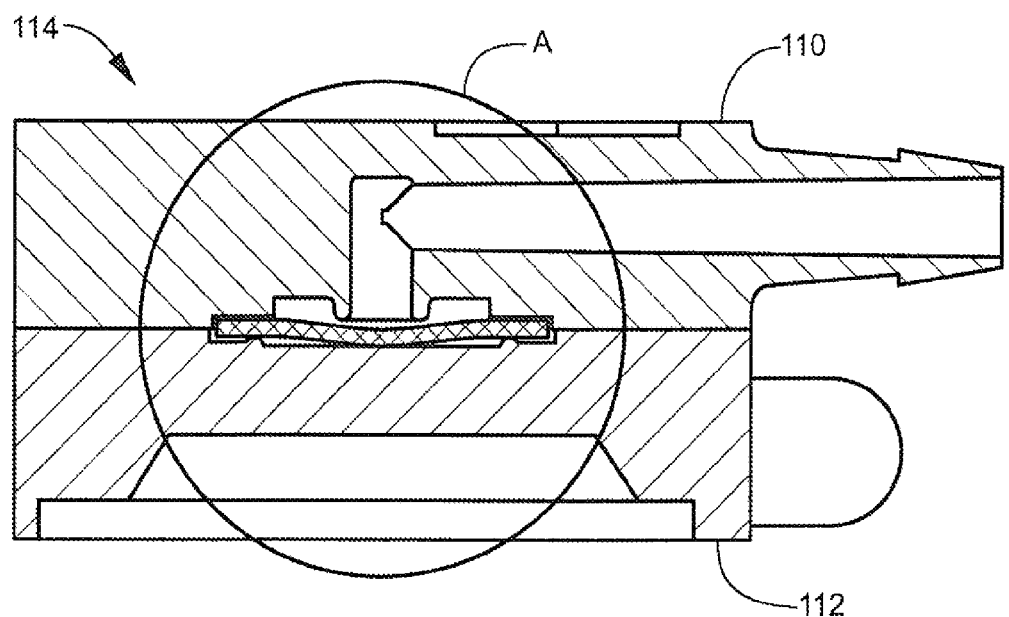
FIG. 8 is a side cross-sectional view of a pump head constructed in accordance with the present invention.

FIG. 7 is a partial cross-sectional view through the inlet valve compartment of an exemplary pump head 114 constructed in accordance with the present invention. FIG. 8 is an orientation view which shows the portion "A" of the pump head 114 that is illustrated in FIG. 7. It is noted that FIGS. 5 and 6 depict the details of the same area of the prior art pump head 14. The pump head 114 is substantially similar to the prior art pump head 14 described above and includes a chamber 112, a head 110, and an inlet valve 128. The chamber 112 has an inlet valve pocket with a reduced depth "d", relative to the prior art. In this example, the depth "d" of the inlet valve pocket 134 is set such that the inlet valve travel is only about 0.64 mm (0.025 in.), instead of the 1.14 mm (0.050 in.) allowed for the prior art inlet valve 28 in the same application. This prevents over-travel of the inlet valve 128. The travel of the outlet valve (not shown) is limited in a similar fashion, by modifying the depth of the outlet valve pocket in the head 110.

The inverse of over-travel is under-travel. If the valve is limited from traveling far enough, the flow of media through the port is restricted and the pump efficiency is again compromised. To overcome this condition, the pump speed would need to be increased to make up for the built-in restriction, thus consuming more energy and operating at higher noise levels. It is therefore important to note that the valve travel is not simply reduced. The valve travel must be matched to the performance requirements of the pump and the characteristics of the valve material. Elastomer durometer, for example, will affect how the valve travel should be controlled. A lower durometer material, 40 durometer for example, will have a much greater uninhibited travel than say a 90 durometer material and will require a tighter control on valve travel distance. Under-travel may be controlled by the selection of elastomeric material used for the valve. A higher durometer elastomer, 90 durometer for example, will not be as likely to succumb to an over-extension during its open time, but will also not seal as well against the valve seat when it is in a closed position, and may be subject to under-travel.

A benefit of using a softer durometer material is a more efficient sealing condition between the elastomeric valve and the valve seat. A softer durometer elastomer, 40 durometer for example, will seal more effectively being more able to conform to minor irregularities in the sealing surface. The more flexible material will, however, be more apt to over-extend during the actuation of the valve thus staying open longer than required. The limitation of the valve stroke in the present invention allows the use of a relatively soft durometer elastomer for the valve by the limiting of the pocket depth.

It has been found that by controlling the valve travel as described above, the pump will become more efficient and, all other conditions being equal, the overall pump performance will improve. It is noted that just by regulating the valve stroke to a more efficient point, the sound level of the pump has a tendency to be reduced slightly. Furthermore, because the overall pump performance increases, the speed of the pump can be reduced to return the performance to the desired level. As pump speed is one of the largest contributing factors for elevated sound levels, this has an even more dramatic effect on reducing the noise levels.

The optimum valve stroke will differ depending on the style of pump, the type of valve material, and the media being pumped. A mid range air pump using a 70 durometer ethylene propylene diene terpolymer (EPDM) valve, for example, may run most efficiently with a valve stroke of 0.64 mm (0.025 in.) A lower performance pump using an 80 durometer VITON valve material, for example, may benefit from a valve stroke as low as 0.13 mm (0.005 in.) Overall pump head size will also contribute in defining the correct stroke length. A larger pump for example will have a larger valve with a greater length and sealing surface area and may operate more efficiently with a higher valve stroke. The inlet valve and outlet valve may obtain optimum performance using different stroke distances. The important considerations are to choose the valve material and the valve pocket depth so that the valve stroke will be large enough to provide unrestricted flow for the fluid media, without being so large as to risk breaking the valve, causing excessive noise or creating valve overlap as noted above. Other materials which meet these requirements, such as silicone, may be used. This technique may be applied to pumps for both air and liquid with the same benefits being seen accordingly.

There are other benefits to limiting the valve stroke. For example, some types of working media, such as corrosive gaseous or liquid chemicals, may attack the valve material and cause deterioration. Therefore, special materials such as perflouroelastomers, which are resistant to harsh chemicals, are used to construct the valve. These materials have a relatively low flexural strength and will not withstand extreme bending. If these materials are displaced beyond their limit, they can actually crack and/or break, and may fail if subjected to standard valve deflection. By controlling the displacement of the valve, exotic materials that have a lower flexural strength can be utilized without the risk of a pump failure because of a compromised valve.

The foregoing has described a valve for use with a diaphragm pump. While specific embodiments of the present invention have been described, it will be apparent to those skilled in the art that various modifications thereto can be made without departing from the spirit and scope of the invention. It will also be apparent that pumps other than diaphragm pumps that use similar valve technology will see the same benefits from this invention. Accordingly, the foregoing description of the preferred embodiment of the invention and the best mode for practicing the invention are provided for the purpose of illustration only, and not for the purpose of limitation.

What is claimed is:

1. A valve assembly comprising:
    a pump chamber having a first recess formed therein;
    a pump head having a second recess formed therein cooperating with the first recess to define a valve compartment, an annular valve seat extending into the valve compartment, and an opposing side of the valve compartment opposite the annular valve seat; and
    an apertureless flexible valve element positioned in the valve compartment and comprising:
    a generally circular central portion that is movable between the annular valve seat and the opposing side of the valve compartment;
    a pair of end tabs that are diametrically opposed to each other with respect to the generally circular central portion and that are trapped between the pump chamber and the pump head; and
    a pair of diametrically opposed necked down portions by which the end tabs are attached to the central portion;
    the flexible valve element having a flat closed configuration in which a first side of the central portion contacts the annular valve seat and a centrally-flexed open configuration in which a second side of the central portion contacts the opposing side of the valve compartment.

2. A valve assembly according to claim 1, wherein at least one valve compartment outlet hole is formed in the opposing side of the valve compartment, the outlet hole being positioned off center with respect to the generally circular central portion of the flexible valve element.

3. A valve assembly according to claim 1, wherein two valve compartment outlet holes are formed in the opposing side of the valve compartment diametrically opposing each other with respect to the generally circular central portion of the flexible valve element.

4. A valve assembly according to claim 3, wherein:
    the end tabs of the flexible valve element are positioned on a first diametrical axis of the generally circular central portion of the flexible valve element;
    the two valve compartment outlet holes are formed on a second diametrical axis with respect to the central portion; and
    the first diametrical axis is perpendicular to the second diametrical axis.

5. A valve assembly according to claim 1, wherein the flexible valve element has a uniform thickness, and wherein the central portion of the flexible valve element is movable between the open configuration and the closed configuration by a distance of less than 1.6 times the thickness.

6. A valve assembly according to claim 1, wherein the flexible valve element has a uniform thickness, and wherein the central portion of the flexible valve element is movable between the open configuration and the closed configuration by a distance of less than 0.93 times the thickness.

7. A valve assembly according to claim 1, wherein the flexible valve element has a uniform thickness, and wherein the central portion of the flexible valve element is movable between the open configuration and the closed configuration by a distance of less than the thickness.

8. A valve assembly according to claim 1, wherein the first valve element comprises at least one elastomeric material selected from the group consisting of ethylene propylene diene terpolymer, a fluoroelastomer, a perfluoroelastomer, and silicone.

9. A valve assembly according to claim 1 wherein the first valve element has a hardness between 40 and 90 Durometer, shore A.

10. A valve assembly according to claim 1, wherein the annular valve seat extends from the pump head, wherein the opposing side of the valve compartment is defined by the pump chamber, and wherein the valve assembly further comprises:

a pump chamber having a third recess formed therein;

a pump head having a fourth recess formed therein, the fourth recess cooperating with the third recess to define a second valve compartment;

a second annular valve seat extending from the pump chamber and into the second valve compartment; and a second flexible valve element positioned in the second valve compartment, the second flexible valve element comprising:

a generally circular central portion that is movable between the second annular valve seat and the pump head;

a pair of end tabs that are diametrically opposed to each other with respect to the generally circular central portion and that are trapped between the pump chamber and the pump head; and a pair of diametrically opposed necked down portions by which the end tabs are attached to the central portion;

the flexible valve element having a flat closed configuration in which a first side of the central portion contacts the annular valve seat and a centrally-flexed open configuration in which a second side of the central portion contacts the pump head.

11. A valve assembly according to claim 1, wherein:

the first recess has a generally circular central portion in which the central portion of the flexible valve element is movable, and a pair of rectangular portions, which are diametrically opposed to each other with respect to the generally circular central portion and within which the end tabs of the flexible valve element are trapped;

the central portion of the first recess is deeper than the rectangular portions of the first recess;

the second recess has a generally circular central portion aligned with the central portion of the first recess, and a pair of diametrically opposed rectangular portions aligned with the rectangular portions of the first recess;

the central portion of the second recess is deeper than the rectangular portions of the second recess; and the annular valve seat is centrally located in the central portion of the second recess.

12. A valve assembly according to claim 11, wherein two valve compartment outlet holes formed in the generally circular central portion of the first recess diametrically oppose each other on an axis perpendicular to an axis on which the rectangular portions of the first recess oppose each other.

\* \* \* \* \*